US012812607B2

(12) United States Patent
Gürsu et al.

(10) Patent No.: US 12,812,607 B2
(45) Date of Patent: Nov. 24, 2026

(54) TIME DIVISION MULTIPLEXING PATTERN CONFIGURATION

(71) Applicant: Nokia Technologies Oy, Espoo (FI)

(72) Inventors: Halit Murat Gürsu, Munich (DE); Srinivasan Selvaganapathy, Bangalore (IN); Samantha Caporal Del Barrio, Aalborg (DK); Panagiotis Spapis, Munich (DE)

(73) Assignee: Nokia Technologies Oy, Espoo (FI)

(*) Notice: Subject to any disclaimer, the term of this patent is extended or adjusted under 35 U.S.C. 154(b) by 290 days.

(21) Appl. No.: 18/579,637

(22) PCT Filed: Jun. 6, 2022

(86) PCT No.: PCT/FI2022/050388
§ 371 (c)(1),
(2) Date: Jan. 16, 2024

(87) PCT Pub. No.: WO2023/012399
PCT Pub. Date: Feb. 9, 2023

(65) Prior Publication Data

US 2024/0323924 A1 Sep. 26, 2024

(30) Foreign Application Priority Data

Aug. 6, 2021 (IN) ............................ 202141035641

(51) Int. Cl.
*H04W 72/04* (2023.01)

(52) U.S. Cl.
CPC .................................. *H04W 72/04* (2013.01)

(58) Field of Classification Search
None
See application file for complete search history.

(56) References Cited

U.S. PATENT DOCUMENTS

2016/0066276 A1* 3/2016 Su ......................... H04W 72/02 370/252
2020/0021421 A1* 1/2020 Han ......................... H04L 5/14
(Continued)

FOREIGN PATENT DOCUMENTS

WO 2020/259852 A1 12/2020
WO 2021/033092 A1 2/2021
(Continued)

OTHER PUBLICATIONS

Extended European Search Report received for corresponding European Patent Application No. 22852394.0, dated May 15, 2025, 11 pages.

(Continued)

*Primary Examiner* — Benjamin Lamont
(74) *Attorney, Agent, or Firm* — Lippes Mathias LLP

(57) ABSTRACT

Systems, methods, apparatuses, and computer program products for time division multiplexing pattern configuration. The method may include detecting (900) a power exposure event at a user equipment. The method may also include reporting (905) the power exposure event to a network element. The method may further include receiving (910) instructions from the network element to activate a duty cycle pattern at the user equipment. In addition, the method may include activating (915) the duty cycle pattern by performing uplink transmission based on a new communication pattern.

13 Claims, 9 Drawing Sheets

(56) References Cited

U.S. PATENT DOCUMENTS

| | | | | |
|---|---|---|---|---|
| 2020/0145927 | A1* | 5/2020 | Sun | H04W 52/146 |
| 2020/0267723 | A1 | 8/2020 | Viering et al. | |
| 2020/0411960 | A1* | 12/2020 | Ng | G01S 13/582 |
| 2022/0240234 | A1* | 7/2022 | Cao | H04L 5/0053 |
| 2022/0264483 | A1* | 8/2022 | Xing | H04W 52/367 |
| 2023/0009163 | A1* | 1/2023 | Cui | H04W 72/21 |
| 2024/0056115 | A1* | 2/2024 | Zhou | H04W 74/0833 |
| 2024/0089872 | A1* | 3/2024 | Bergljung | H04W 52/146 |

FOREIGN PATENT DOCUMENTS

| | | | |
|---|---|---|---|
| WO | 2021/064698 | A1 | 4/2021 |
| WO | 2021/088052 | A1 | 5/2021 |

OTHER PUBLICATIONS

"RAN1 agreements for NR_eMIMO", 3GPP TSG RAN WG1 99, R1-1913604, Agenda item: 7.2.8, Samsung, Nov. 18-22, 2019, 68 pages.

Raghavan et al., "Antenna Placement and Performance Tradeoffs With Hand Blockage in Millimeter Wave Systems", IEEE Transactions on Communications, vol. 67, No. 4, Apr. 2019, pp. 3082-3096.

"3rd Generation Partnership Project; Technical Specification Group Radio Access Network; NR; Physical layer procedures for control (Release 15)", 3GPP TS 38.213, V15.7.0, Sep. 2019, pp. 1-108.

"3rd Generation Partnership Project; Technical Specification Group Radio Access Network; NR; Requirements for support of radio resource management (Release 17)", 3GPP TS 38.133, V17.1.0, Mar. 2021, 2172 pages.

"Introduction of the P-MPR 2 bits report mapping in 38.133", 3GPP TSG-RAN WG4 Meeting #96-e, R4-2011736, InterDigital Inc., Aug. 17-28, 2020, 2 pages.

"Introduction of MPE related P-MPR operation in sub-clause 6.2.4", 3GPP TSG-RAN WG4 Meeting #96-e, R4-2011735, InterDigital Inc., Aug. 17-28, 2020, 3 pages.

"Introduction of MPE reporting", 3GPP RAN WG2 Meeting #111-e, R2-2008595, InterDigital, Aug. 17-28, 2020, 6 pages.

"Introduction of MPE reporting", 3GPP RAN WG2 Meeting #111-e, R2-2008570, Interdigital, Aug. 17-28, 2020, 9 pages.

"Msc-generator", Sourceforge, Retrieved on Jan. 3, 2024, Webpage available at : https://sourceforge.net/projects/msc-generator/.

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"3rd Generation Partnership Project; Technical Specification Group Radio Access Network; NG-RAN; Xn application protocol (XnAP) (Release 16)", 3GPP TS 38.423, V16.5.0, Apr. 2021, pp. 1-461.

International Search Report and Written Opinion received for corresponding Patent Cooperation Treaty Application No. PCT/FI2022/050388, dated Sep. 7, 2022, 17 pages.

* cited by examiner

TIME DIVISION MULTIPLEXING PATTERN CONFIGURATION

RELATED APPLICATION

This application claims priority to PCT Application No. PCT/FI2022/050388, filed on Jun. 6, 2022, which claims priority to IN application No. 202141035641, filed on Aug. 6, 2021, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for time division multiplexing pattern configuration.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR technology and named NG-eNB when built on E-UTRAN radio.

SUMMARY

Some example embodiments may be directed to a method. The method may include detecting a power exposure event at a user equipment. The method may also include reporting the power exposure event to a network element. The method may further include receiving instructions from the network element to activate a duty cycle pattern at the user equipment. In addition, the method may include activating the duty cycle pattern by performing uplink transmission based on a new communication pattern.

Other example embodiments may be directed to an apparatus. The apparatus may include at least one processor and at least one memory including computer program code. The at least one memory and computer program code may also be configured to, with the at least one processor, cause the apparatus at least to detect a power exposure event at the apparatus. The apparatus may also be caused to report the power exposure event to a network element. The apparatus may further be caused to receive instructions from the network element to activate a duty cycle pattern at the apparatus. In addition, the apparatus may be caused to activate the duty cycle pattern by performing uplink transmission based on a new communication pattern.

Other example embodiments may be directed to an apparatus. The apparatus may include means for detecting a power exposure event at the apparatus. The apparatus may also include means for reporting the power exposure event to a network element. The apparatus may further include means for receiving instructions from the network element to activate a duty cycle pattern at the apparatus. In addition, the apparatus may include means for activating the duty cycle pattern by performing uplink transmission based on a new communication pattern.

In accordance with other example embodiments, a non-transitory computer readable medium may be encoded with instructions that may, when executed in hardware, perform a method. The method may include detecting a power exposure event at a user equipment. The method may also include reporting the power exposure event to a network element. The method may further include receiving instructions from the network element to activate a duty cycle pattern at the user equipment. In addition, the method may include activating the duty cycle pattern by performing uplink transmission based on a new communication pattern.

Other example embodiments may be directed to a computer program product that performs a method. The method may include detecting a power exposure event at a user equipment. The method may also include reporting the power exposure event to a network element. The method may further include receiving instructions from the network element to activate a duty cycle pattern at the user equipment. In addition, the method may include activating the duty cycle pattern by performing uplink transmission based on a new communication pattern.

Other example embodiments may be directed to an apparatus that may include circuitry configured to measure, at the apparatus, a radio altimeter signal. The apparatus may also include circuitry configured to detect a power exposure event at the apparatus. The apparatus may also include circuitry configured to report the power exposure event to a network element. The apparatus may further include circuitry configured to receive instructions from the network element to activate a duty cycle pattern at the apparatus. In addition, the apparatus may include circuitry configured to activate the duty cycle pattern by performing uplink transmission based on a new communication pattern.

Certain example embodiments may be directed to a method. The method may include receiving configuration of a first communication pattern for uplink coordination for a user equipment. The method may also include configuring the user equipment with the first communication pattern for uplink coordination. The method may further include receiving a report from the user equipment of a power exposure event at the user equipment during the first communication pattern. In addition, the method may include requesting from a primary or a secondary cell of a new communication pattern, and receiving an acknowledgement of the requested new communication pattern, or informing a primary or a secondary cell of the new communication pattern, and enforcing an uplink duty cycle pattern at the user equipment in response to the power exposure event.

Other example embodiments may be directed to an apparatus. The apparatus may include at least one processor and at least one memory including computer program code. The at least one memory and computer program code may be configured to, with the at least one processor, cause the apparatus at least to receive configuration of a first communication pattern for uplink coordination for a user equipment. The apparatus may also be caused to configure the user equipment with the first communication pattern for uplink coordination. The apparatus may further be caused to receive a report from the user equipment of a power exposure event at the user equipment during the first communication pattern. In addition, the apparatus may be caused to request from a primary or a secondary cell of a new communication pattern, and receive an acknowledgement of the requested new communication pattern, or inform a primary or a secondary cell of the new communication pattern, and enforce an uplink duty cycle pattern at the user equipment in response to the power exposure event.

Other example embodiments may be directed to an apparatus. The apparatus may include means for receiving configuration of a first communication pattern for uplink coordination for a user equipment. The apparatus may also include means for configuring the user equipment with the first communication pattern for uplink coordination. The apparatus may further include means for receiving a report from the user equipment of a power exposure event at the user equipment during the first communication pattern. In addition, the apparatus may include means for requesting from a primary or a secondary cell of a new communication pattern, and receiving an acknowledgement of the requested new communication pattern, or informing a primary or a secondary cell of the new communication pattern, and enforcing an uplink duty cycle pattern at the user equipment in response to the power exposure event.

In accordance with other example embodiments, a non-transitory computer readable medium may be encoded with instructions that may, when executed in hardware, perform a method. The method may include receiving configuration of a first communication pattern for uplink coordination for a user equipment. The method may also include configuring the user equipment with the first communication pattern for uplink coordination. The method may further include receiving a report from the user equipment of a power exposure event at the user equipment during the first communication pattern. In addition, the method may include requesting from a primary or a secondary cell of a new communication pattern, and receiving an acknowledgement of the requested new communication pattern, or informing a primary or a secondary cell of the new communication pattern, and enforcing an uplink duty cycle pattern at the user equipment in response to the power exposure event.

Other example embodiments may be directed to a computer program product that performs a method. The method may include receiving configuration of a first communication pattern for uplink coordination for a user equipment. The method may also include configuring the user equipment with the first communication pattern for uplink coordination. The method may further include receiving a report from the user equipment of a power exposure event at the user equipment during the first communication pattern. In addition, the method may include requesting from a primary or a secondary cell of a new communication pattern, and receiving an acknowledgement of the requested new communication pattern, or informing a primary or a secondary cell of the new communication pattern, and enforcing an uplink duty cycle pattern at the user equipment in response to the power exposure event.

Other example embodiments may be directed to an apparatus that may include circuitry configured to receive configuration of a first communication pattern for uplink coordination for a user equipment. The apparatus may also include circuitry configured to configure the user equipment with the first communication pattern for uplink coordination. The apparatus may further include circuitry configured to receive a report from the user equipment of a power exposure event at the user equipment during the first communication pattern. In addition, the apparatus may include circuitry configured to request from a primary or a secondary cell of a new communication pattern, and receive an acknowledgement of the requested new communication pattern, or inform a primary or a secondary cell of the new communication pattern, and enforce an uplink duty cycle pattern at the user equipment in response to the power exposure event.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for time division multiplexing pattern configuration for uplink (UL) with panel specific maximum permissible exposure (MPE).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

In frequency range 2 (FR2), the 5G or Next Generation NodeB (gNB) and user equipment (UE) may operate using narrow beams. That is, the gNB may operate using radiation patterns that are narrower than sector-wide beams as in Long Term Evolution (LTE). Likewise, the UE may operate using radiation patterns narrower than omni-directional beams. Further, certain beam-based operations may depend on a need for an increased array/antenna gain to compensate the higher path loss at mmWaves, but also due to technological limitations. According to certain assumptions in RAN #96 Rel-16, multiple panels may be active simultaneously. However, there may be just one panel used for uplink transmission.

As discussed in 3GPP Rel-16, multiple panels may be implemented on a UE, and multiple panels may be activated at time. However, as noted above, there may be just one panel that can be used for transmission. In some cases, this may not require a UE to activate multiple panels simultaneously. That is, the UE may control the panel activation/deactivation.

Figure 1:
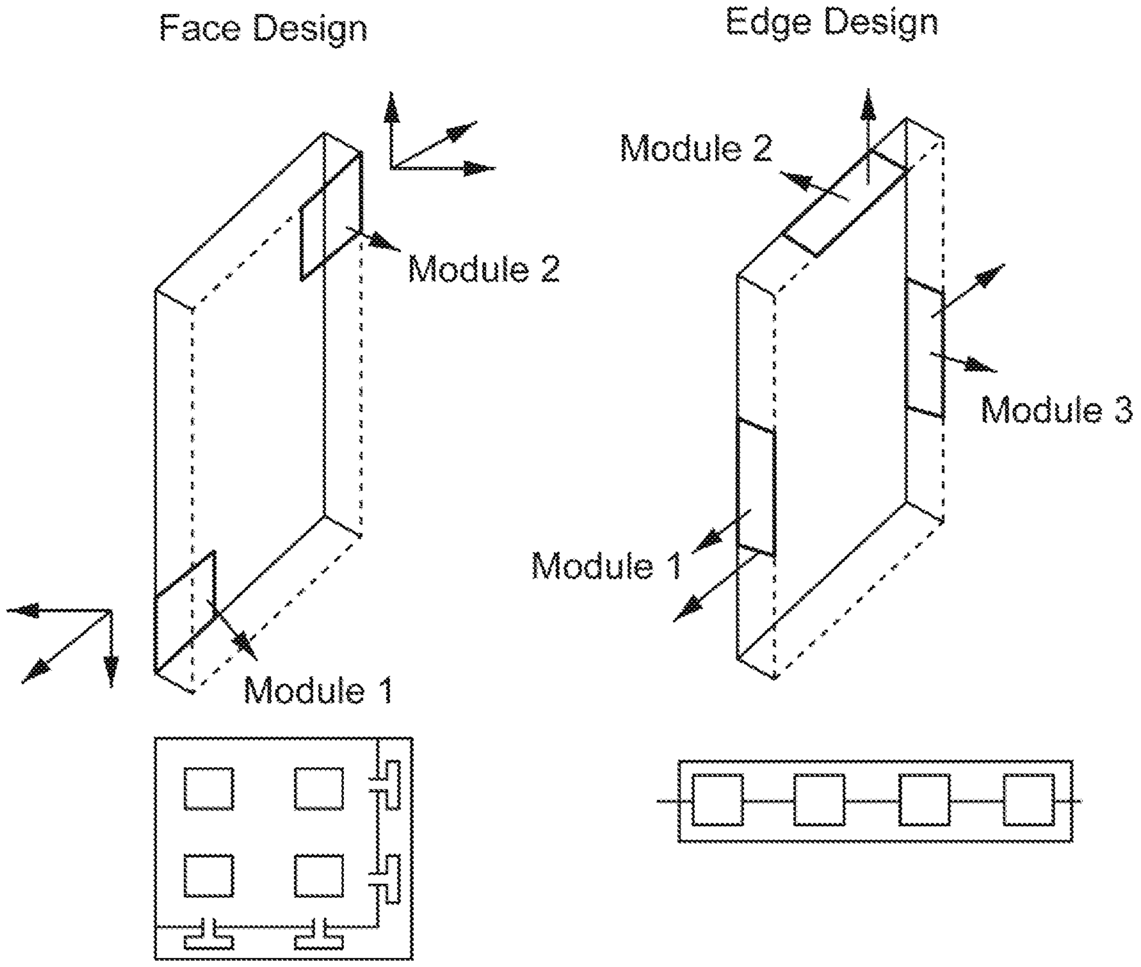
FIG. 1 illustrates an example face and edge panel design.

FIG. 1 illustrates an example face and edge panel design. As illustrated in the example of FIG. 1, examples of the "face" (left side) and "edge panel design" (right side) are provided. The "face panel design" may include two dual-polarized path subarrays, and two 2×1 (single-polarized) dipole subarrays at the edges of the module. In addition, the "edge panel design" may include dual-polarized path subarrays placed on three edges of the UE.

Governmental exposure guidelines have been set in place to prevent health issues due to thermal effects. In particular, the maximum permissible exposure (MPE) represents the regulation on power density for the mmWave regime, and the Federal Communications Commission (FCC) has set the threshold for MPE at 10 W/m2 (1 mW/cm2). For a certain distance separating the human tissue from the antenna, a power back-off (PBO) may be needed for FCC compliance with MPE.

Figure 2:
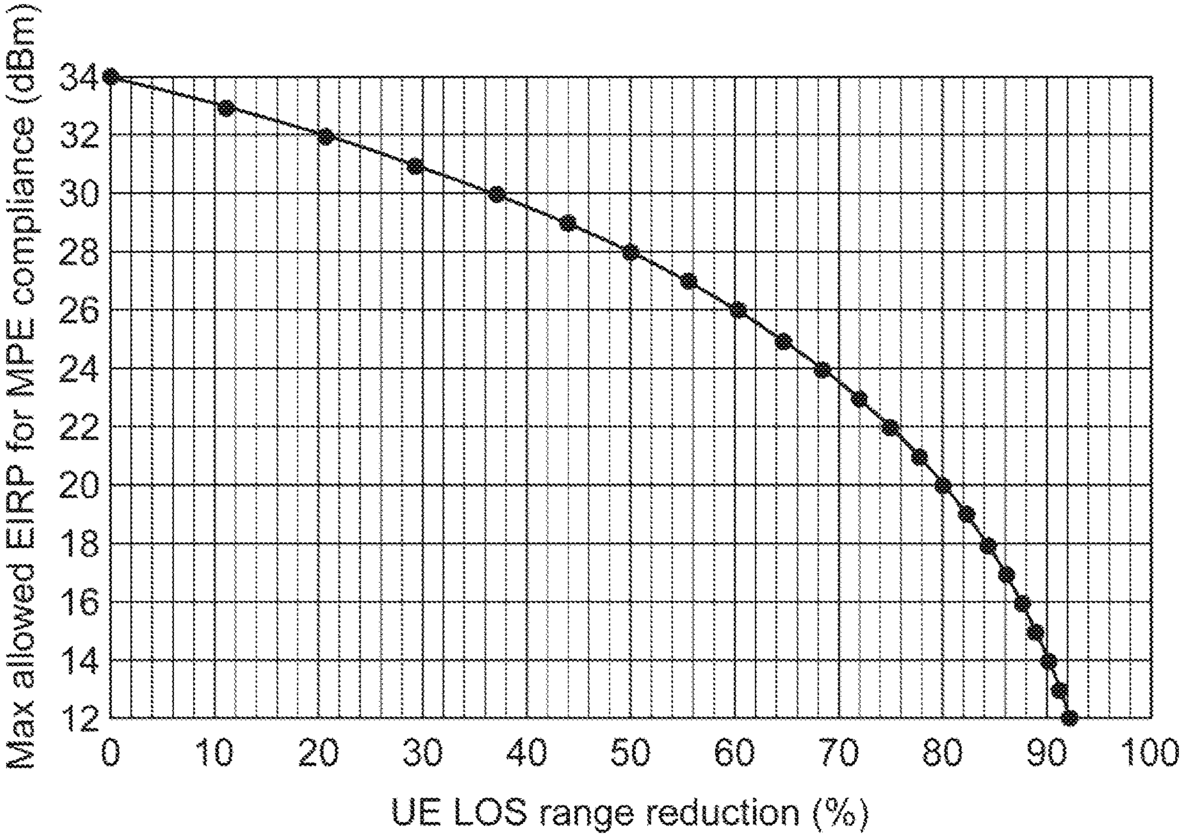
FIG. 2 illustrates an example relationship between the maximum allowed effective isotropic radiated power (EIRP) for MPE compliance and a user equipment (UE) line-of-sight (LOS) range reduction.

FIG. 2 illustrates an example graph of a relationship between the maximum allowed effective isotropic radiated power (EIRP) for MPE compliance and a UE line-of-sight (LOS) range reduction. In some cases, the mmWave NR UEs may equip each panel with a proximity sensor to comply with MPE regulation. For example, a 4×1 array exhibiting EIRP of 34 dBm (i.e., 23 dBm maximum power amplifier (PA) output power and 11 dB array gain) requires a PBO when a user is located less than 14 cm away from the antenna. When the user is nearly touching the antenna (e.g., 2 mm separation), the maximum allowed EIRP for MPE compliance is 10 dBm (power density calculation at the given distance to the array). Thus, in this example, the power needs to be backed-off by 24 dB. The UE range may be significantly impacted by PBO, and 20 dB PBO may reduce the UE range by up to 90%.

Figure 3:
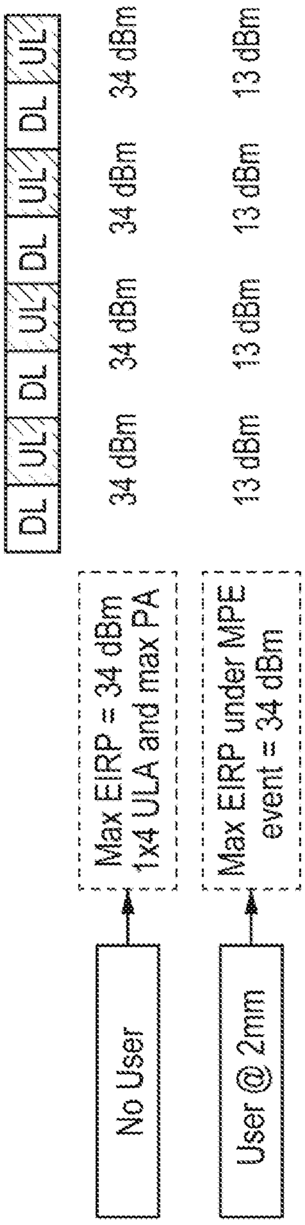
FIG. 3 illustrates an example operation of an antenna array.

PBO throttles may transmit power of UEs that are in power limitation or close to it (e.g., cell edge UEs, non-line-of-sight (NLOS) scenarios, etc.), and may thereby reduce the power received by the gNB and consequently the UL signal-to-noise and interference ratio (SINR) as well. FIG. 3 illustrates an example operation of an antenna array. In particular, FIG. 3 illustrates an efficient 1×4 antenna array operating with maximum PA power at EIRP 34 dBm. When the user touches the array (i.e., 2 mm separation between user and antenna element), the max EIRP may be limited to a maximum of 10 dBm (full UL duty cycle). If the uplink/downlink (UL/DL) scheduling is equally split, the UE may be able to transmit at 13 dBm.

Figure 4:
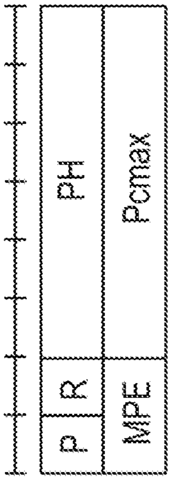
FIG. 4 illustrates an example maximum permissible exposure (MPE) reporting on a serving link.

In some cases, a reactive MPE mitigation mechanism may be provided. For example, when an MPE event is triggered at the UE, the UE may apply power management-maximum power reduction (P-MPR), and send a power headroom report (PHR) (including P-MPR information) to the network. The P-MPR may be reported on the serving MPE events for a serving link in PHR. For instance, FIG. 4 illustrates an example MPE reporting on the serving link. In particular, FIG. 4 illustrates that the MPE on the serving link is reported in FR2 (for a single-entry PHR). Similar reporting may apply for multi-entry PHR, but more per-cell information may be included. In certain example embodiments, an MPE event may be characterized as an event when a human body part is within close proximity to the antenna of the UE. To protect the human body from excessive radiation exposure, the UE may be equipped with sensors to detect the proximity of the human body to the UE. According to certain example embodiments, detection of the human body in proximity may trigger a reduction in UL power. This cause of reduction in UL power may be known as an MPE event.

Figure 5:
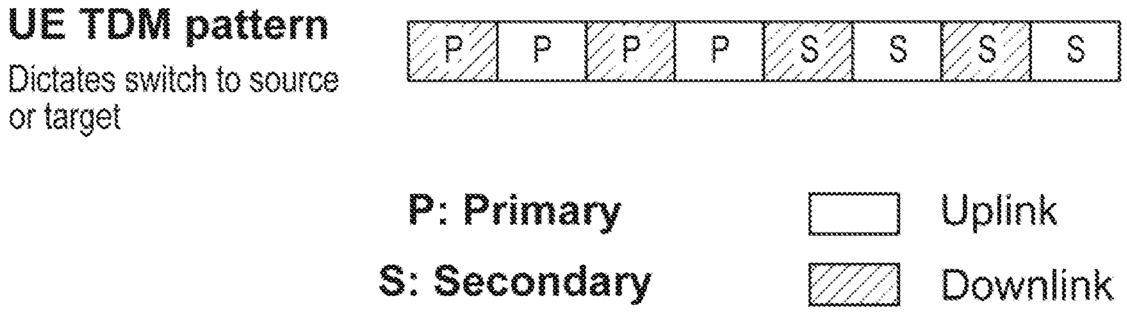
FIG. 5 illustrates an example time division multiplexing (TDM) pattern.

One or more patterns may be configured for time division multiplexing (TDM). Configuring complementary TDM patterns for source and target cells for allowing alternating DL reception at the UE may be accomplished for dual active protocol stack (DAPS) in FR2. Upon reception of the measurement report, the source cell and the target cell may exchange and agree on TDM patterns that may be configured for the UE using a handover (HO) command. According to certain example embodiments, with regard to the measurement report, the UE may be configured to measure neighbor cells autonomously and be controlled by the network. Additionally, the UE may periodically or on an event basis, compile a report and send the measurements in this report to the network. Upon receiving the HO command, the UE may start applying the TDM patterns that allow the UE to receive from one cell at a time in DL. Considering dual connectivity, the UE may need the TDM pattern for UL as well. In this regard, FIG. 5 illustrates an example TDM pattern. In particular, FIG. 5 illustrates a TDM pattern as a mechanism used to set a slot at which time-instance should be used by the UE for UL and DL.

Figure 6:
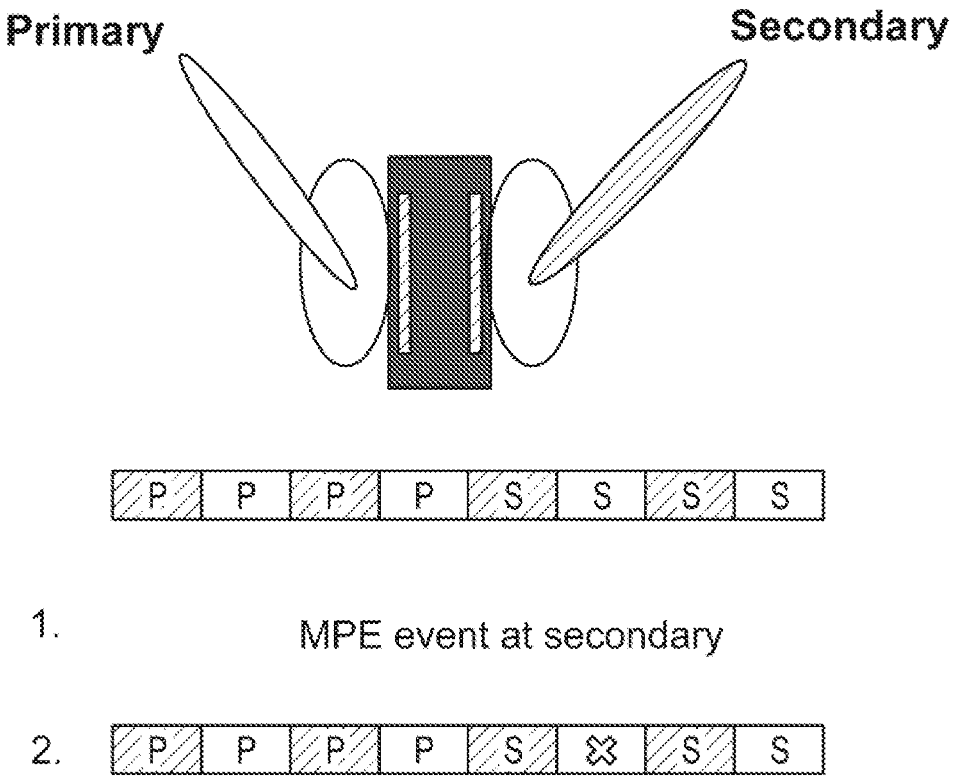
FIG. 6 illustrates an example UE observing an MPE event.

FIG. 6 illustrates an example UE observing an MPE event. In particular, the example of FIG. 6 illustrates the UE observing an MPE event on the panel for the secondary cell, at which time the network may dictate not to use slot 6. As illustrated in FIG. 6, the UE may be in a dual connectivity scenario, there may be a coordination between the primary cell and the secondary cell. After some time, the UE may experience an MPE event at a panel for the secondary cell. As the MPE enforces a decrease in the average UL power over-time, the network may disallow the use of slot 6 by the UE for UL communication. In this example, since the primary cell is unaware of the MPE event, slot 6 would simply be wasted for the UE.

Currently, UL coordination may be achieved through prioritization of the secondary or target cell in case of an overlapping UL grant is sent to the UE. However, such a solution does not allow dynamic use of UL slots in case of an MPE event. Further, it may be assumed that the UE is asked to enforce a duty cycle by the cell where the MPE event occurred. However, this does not cover the multi-connectivity scenario. In addition, there may be certain TDM pattern for DAPS, which may applied for DL coordination. However, UL coordination may not be considered.

According to certain example embodiments, it may be possible to improve UL TDM coordination for a UE with multiple active links under MPE consideration. In some example embodiments, an UL TDM pattern may be generated for the UE whether due to MPE limitations or due to a single Tx antenna of the UE.

In certain example embodiments, after the UE reports an MPE event to one of its active cells, that cell may activate an UL duty cycling pattern at the UE. According to certain example embodiments, the UE may report the MPE event either indirectly for UL scheduling, or directly (via medium access control control element (MAC CE)) for random access channel (RACH), semi-persistent scheduling. With regard to reporting the MPE event indirectly, the UE may indicate a required change for UL scheduling (e.g., change in UL TDM pattern). This may indicate to the network that the UE may have experienced an MPE event. Afterwards, the active cell may inform other active cells about the change in the UE UL regime. For instance, in some example embodiments, the UE may have activated a duty cycling solution freeing an UL slot to be used by other active cells of the UE. Additionally, in some example embodiments, the other active cell(s) that received the information from the initial active cell may schedule the UE with an UL grant for the freed up UL slot.

According to other example embodiments, the UE may be preconfigured with multiple UL TDM patterns. In this example, once the UE reports an MPE event, it may autonomously switch to one of the preconfigured UL TDM patterns. This may enable the UE to enable UL duty cycling, and switch the UL slot use from one active cell with MPE to another active cell without an MPE event. The former cell may inform the latter cell through a message such that the UE may be scheduled for UL by the latter cell.

In further example embodiments, the UE may be preconfigured with multiple UL TDM patterns. Once the UE reports an MPE event to the active cell, the network may signal the UE to switch from a current UL TDM pattern to one of the preconfigured UL TDM patterns. This may enable the UE to enable UL duty cycling and switch the UL slot use from one active cell with an MPE event to another cell without an MPE event. The former cell may inform the latter cell through a message such that the UE may be scheduled for UL by the latter cell.

Figure 7:
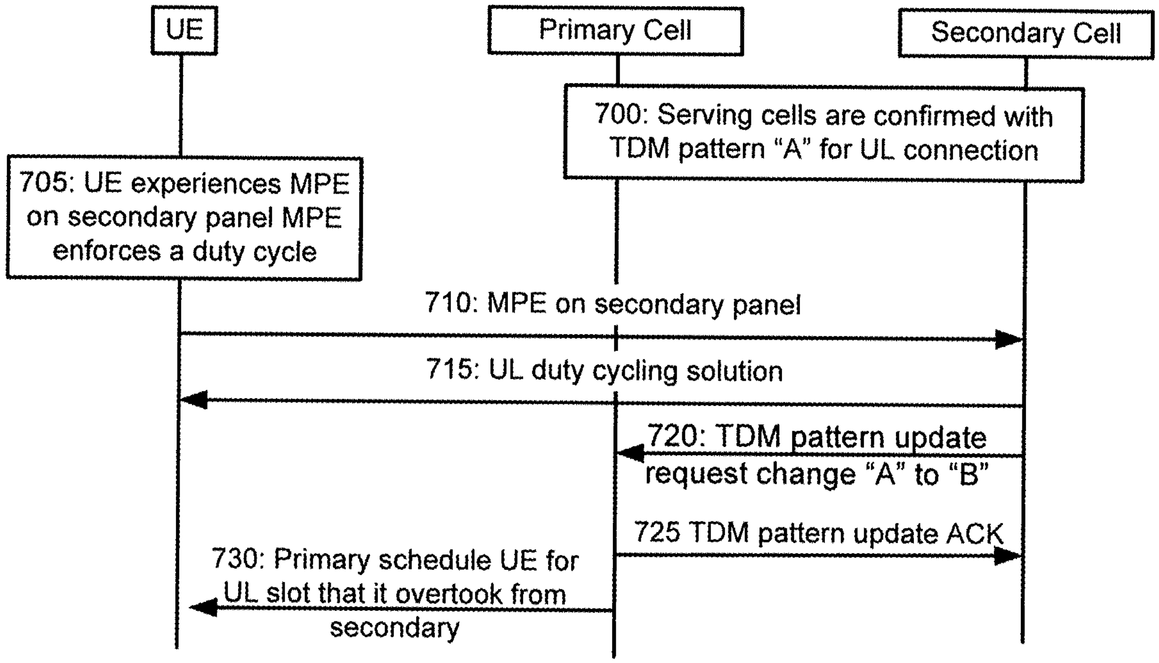
FIG. 7 illustrates an example signal diagram of an uplink TDM pattern update, according to certain example embodiments.

FIG. 7 illustrates an example signal diagram of an UL TDM pattern update, according to certain example embodiments. In particular, the example signal diagram of FIG. 7 illustrates an UL TDM pattern update for a UE with multiple active links transparent to the UE. The signal diagram illustrated in FIG. 7 may involve a UE, a primary cell or source cell, and a secondary cell or target cell, where the primary cell/source cell and the secondary cell/target cell may both be referred to as active cells or serving cells. At 700, the active cells may use a TDM pattern "A" for UL coordination for the UE. In particular, the UL coordination may relate to the coordination between two active links (e.g., two gNBs communication to the UE) of the UE, about which gNB will schedule the UE for UL on which specific time. This may be helpful as overlapping scheduling may cause non-received UL at the UE side. Although a TDM pattern "A" is illustrated, the active cells in other example embodiments may be configured with other types of TDM patterns. According to certain example embodiments, the UL TDM pattern may indicate which UL slots are used for the source cell, and which DL slots are used for the target cell. According to other example embodiments, the UL TDM pattern may be applied in frequency division duplex (FDD) or time division duplex (TDD).

At 705, the UE may experience an MPE event on a panel, such as, for example, the secondary panel, and the MPE event may enforce a duty cycle. In this instance, the UE may be configured by the network to enable the duty cycle. Furthermore, the UE may enable the duty cycle, but the network may configure the UE to do so. Thus, when the MPE event occurs, the UE may enforce (i.e., trigger) a duty cycle. At 710, the UE may transmit a report of the MPE event to the secondary cell. According to certain example embodiments, the report may include different P-MPR levels. For instance, if the P-MPR is 6 dB, then the TDM may be updated to allow a certain number of available UL slots such as, for example, $1/4^{th}$ of the available UL slots. At 715, the secondary cell may enforce an UL duty cycling solution to the UE. According to certain example embodiments, the UL duty cycling enforced to the UE may identify which slots should not be used by the UE for UL with the active cell (i.e., the secondary cell or the source cell).

At 720, the secondary cell may transmit to the primary cell, a TDM pattern update request change from "A" to "B". That is, the secondary cell may suggest a new TDM pattern (e.g., TDM pattern "B") to the primary cell with respect to the MPE level, and indicate which UL slots are not used. At 725, the primary cell may acknowledge the TDM pattern update by transmitting an ACK message to the secondary cell. At 730, the primary cell may schedule the UE for the UL slot (e.g., unused slot) that was identified by the secondary cell. In other words, the primary cell may schedule the UE for UL with respect to the new TDM pattern (e.g., TDM pattern "B"). In certain example embodiments, the signal diagram of FIG. 7 may assume that the UE does not need an explicit TDM pattern configuration for UL as it may be configured with logical channel prioritization (i.e., RACH at primary versus RACH at secondary cell, or semi-persistent scheduling resources).

Figure 8:
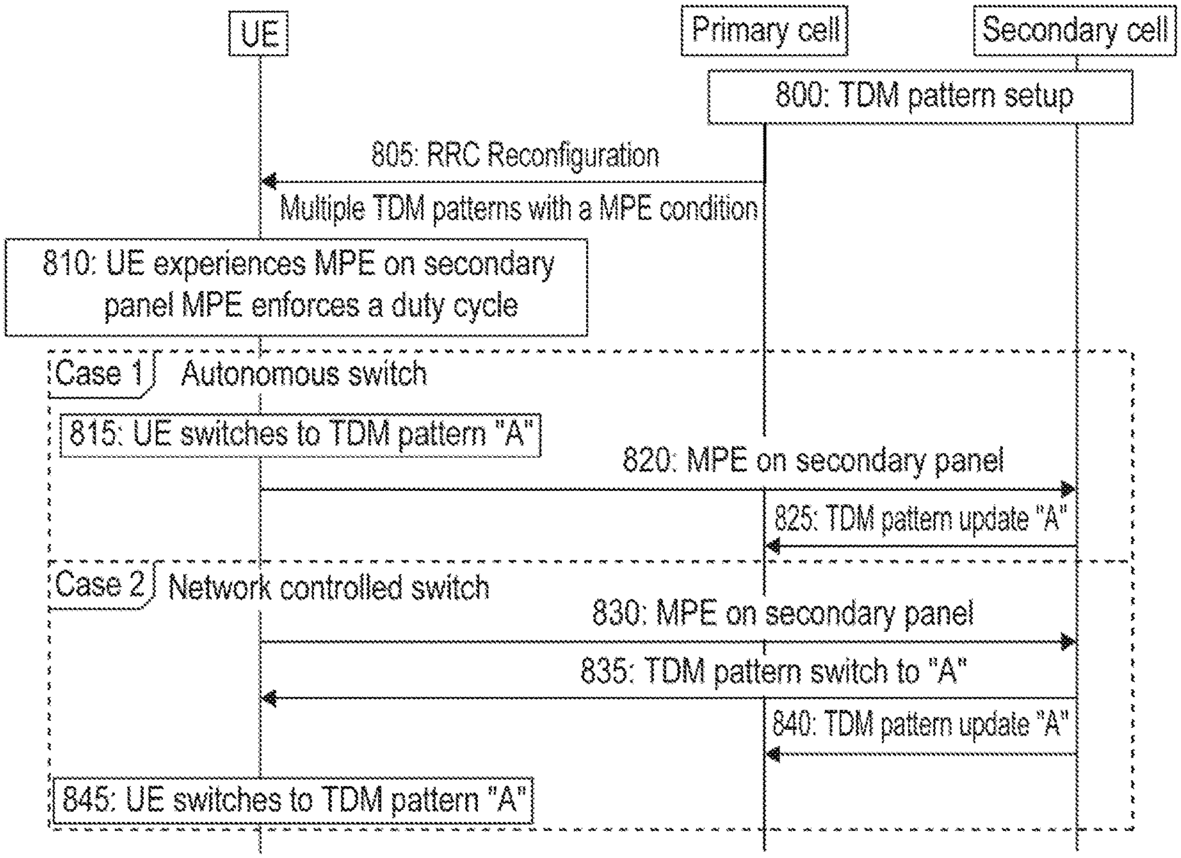
FIG. 8 illustrates an example signal diagram of an UL TDM pattern update, according to certain example embodiments.

FIG. 8 illustrates an example signal diagram of an UL TDM pattern update, according to certain example embodiments. In particular, FIG. 8 illustrates a signal diagram of an UL TDM pattern update for a UE with multiple active links through UE configurations. At 800, the primary cell and the secondary cell may negotiate a TDM pattern setup. For example, the primary/source cell may ask the target/secondary cell to use an UL TDM pattern. The target/secondary cell may reject this pattern, and indicate a reason(s) why. Alternatively, the target/secondary cell may accept this pattern. In case of rejection, the source/primary cell may propose a new UL TDM pattern. Further, in case of acceptance of the TDM pattern, the primary/source cell may terminate the TDM pattern negotiation. At 805, the primary cell may preconfigure one or more TDM patterns with an MPE condition to the UE. For instance, an MPE event may be detected on different levels. Thus, the UE may be configured of which MPE level triggers an MPE condition. According to certain example embodiments, the pre-configuration by the primary cell may be performed via an RRC reconfiguration with one or more TDM patterns with an MPE condition. In certain example embodiments, if there is no MPE, then a TDM pattern “A” may be used, which may include using UL slots (1, 2, 3, 4) for the primary cell, and UL slots (5, 6, 7, 8, 9, and 10) for the secondary cell (in FDD). In other example embodiments, if there is no MPE, then a TDM pattern “C” may be used, which may include using UL slots (1, 3) for the primary cell, and UL slots (6, 8) for the secondary cell (TDD). In further example embodiments, if P-MPR 3 dB is not used, then TDM pattern B may be used, which may include UL slots (1, 3, 6) for the primary cell, and UL slot (8) for the secondary cell (in TDD).

At 810, the UE may observe an MPE event in the secondary cell panel, and the MPE may enforce a duty cycle. For example, as noted above, the UE may be configured by the network to enable the duty cycle. Furthermore, the UE may enable the duty cycle, but the network may configure the UE to do so. Thus, when the MPE event occurs, the UE may enforce (i.e., trigger) a duty cycle. According to certain example embodiments, once the UE reports an MPE event, the UE may autonomously switch to one of the pre-configured UL TDM patterns. For instance, in this example, at 815, the UE may switch to TDM pattern “A”. At 820, the UE may inform the secondary cell about the MPE event on the secondary panel, and at 825, the secondary cell may inform the primary cell about the UL TDM pattern change to “A”.

According to other example embodiments, once the UE reports an MPE event, the network may signal the UE to switch from a current UL TDM pattern to one of the pre-configured UL TDM patterns. For instance, at 830, the UE may inform the secondary cell about the MPE event, and at 835, the secondary cell may inform the UE about the UL TDM pattern change to “A”. In other words, at 830, the secondary cell may acknowledge the switch to “A”. At 835, the secondary cell may inform the primary cell about the UL TDM pattern change, and at 840, the UE may switch the UL TDM pattern to “A”.

Figure 9:
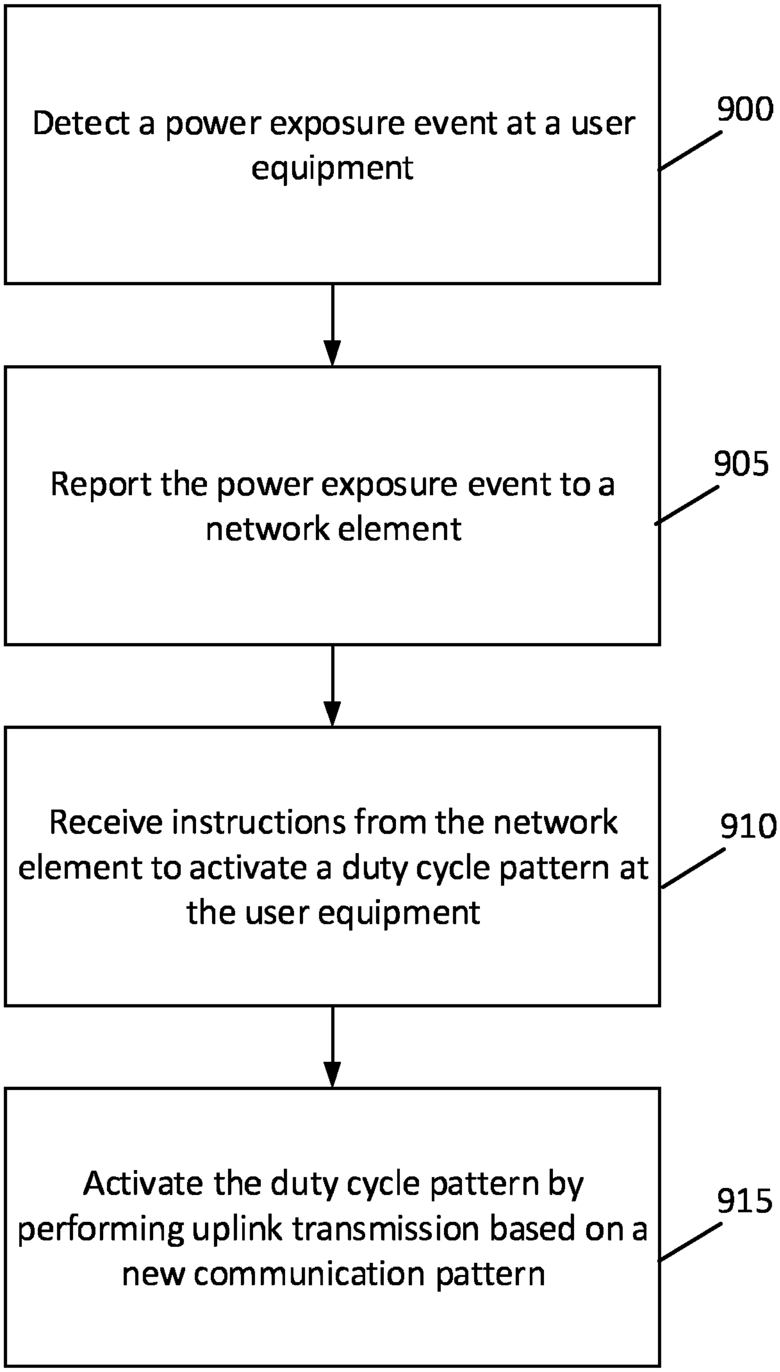
FIG. 9 illustrates an example flow diagram of a method, according to certain example embodiments.

FIG. 9 illustrates an example flow diagram of a method, according to certain example embodiments. In an example embodiment, the method of FIG. 9 may be performed by a network entity, or a group of multiple network elements in a 3GPP system, such as LTE or 5G-NR. For instance, in an example embodiment, the method of FIG. 9 may be performed by a UE, for instance, similar to apparatuses 10 or 20 illustrated in FIG. 11.

According to certain example embodiments, the method of FIG. 9 may include, at 900, detecting a power exposure event at the apparatus. At 905, the method may also include reporting the power exposure event to a network element. At 910, the method may further include receiving instructions from the network element to activate a duty cycle pattern at the user equipment. In addition, at 915, the method may include activating the duty cycle pattern by performing uplink transmission based on a new communication pattern.

According to certain example embodiments, the report of the power exposure event may include a report of a power management-maximum power reduction level. According to other example embodiments, activating the duty cycle pattern may include identifying which transmission slot is not used by the user equipment for uplink with the network element. According to some example embodiments, the user equipment may be pre-configured with a plurality of uplink communication patterns. In certain example embodiments, the method may also include autonomously switching from a current communication pattern or a current duty cycle to one of the pre-configured uplink communication patterns or a current duty cycle. In other example embodiments, the method may further include receiving instructions from the network element to switch from a current uplink communication pattern to one of the pre-configured uplink communication patterns.

Figure 10:
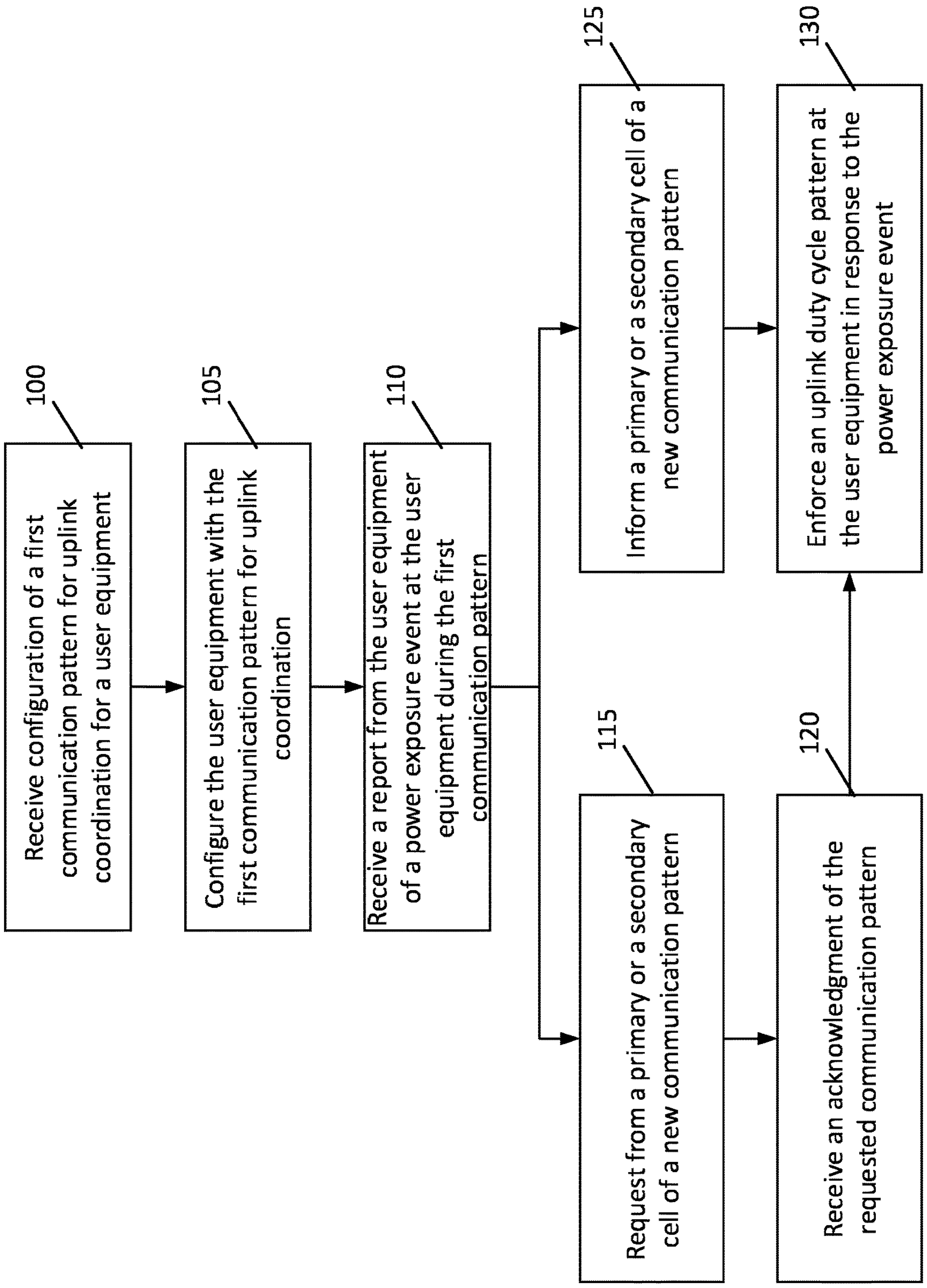
FIG. 10 illustrates an example of a flow diagram of another method, according to certain example embodiments.

FIG. 10 illustrates an example flow diagram of another method, according to certain example embodiments. In an example embodiment, the method of FIG. 10 may be performed by a network entity, network node, or a group of multiple network elements in a 3GPP system, such as LTE or 5G-NR. For instance, in an example embodiment, the method of FIG. 10 may be performed by a secondary cell or target cell, for instance, similar to apparatuses 10 or 20 illustrated in FIG. 11.

According to certain example embodiments, the method of FIG. 10 may include, at 100, receiving configuration of a first communication pattern for uplink coordination for a user equipment. Further, at 105, the method may include configuring the user equipment with the first communication pattern for uplink coordination. In addition, a 110, the method may include receiving a report from the user equipment of a power exposure event at the user equipment during the first communication pattern. At 115, the method may also include requesting from a primary or a secondary cell of a new communication pattern, and at 120, receiving an acknowledgment of the requested communication pattern. Alternatively, at 125, the method may include informing the primary or the secondary cell of the new communication pattern, and at 130, enforcing an uplink duty cycle pattern at the user equipment in response to the power exposure event.

According to certain example embodiments, the uplink duty cycle pattern may include an identification of one or more slots that are not used by the use equipment for uplink communication. According to some example embodiments, the request of the new communication pattern may include indicating one or more uplink slots that are not used. According to other example embodiments, the method may also include pre-configuring the user equipment with a plurality of communication patterns with a corresponding power exposure event condition. In certain example embodiments, the method may further include signaling the user equipment to switch from a current uplink communication pattern to one of the plurality of pre-configured uplink communication patterns. In other example embodiments, the primary or the secondary cell is informed, or the primary or the secondary cell is requested to provide acknowledgement for the new communication pattern. According to some example embodiments, when the primary or the secondary cell is informed, or the primary or the secondary cell is requested to provide acknowledgement for the new communication pattern, the primary or the secondary cell may also be informed of, or the primary or the secondary cell may be requested to provide an indication of uplink slots that are not used.

Figure 11:
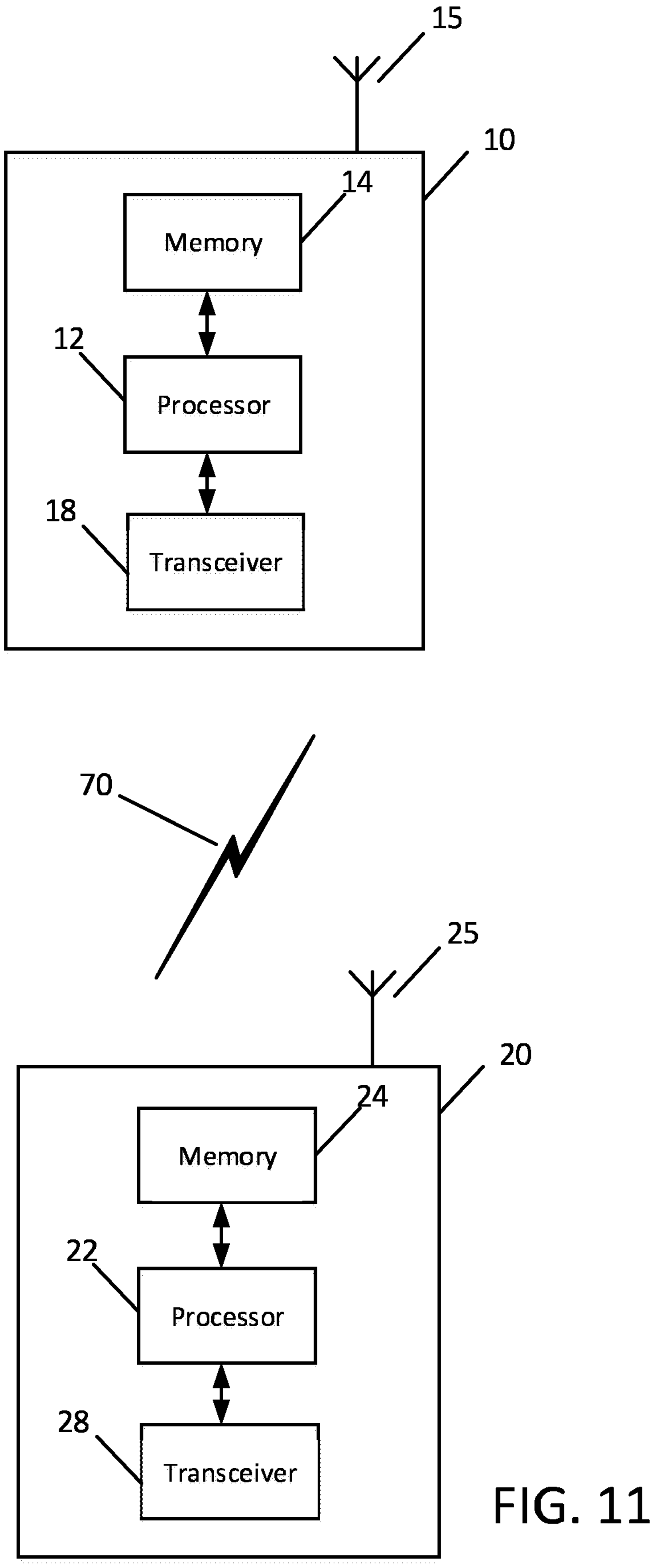
FIG. 11 illustrates a set of apparatuses, according to certain example embodiments.

FIG. 11 illustrates a set of apparatuses 10 and 20 according to certain example embodiments. In certain example embodiments, apparatus 10 may be a node or element in a communications network or associated with such a network, such as a UE, mobile equipment (ME), mobile station, mobile device, stationary device, or other device. It should be noted that one of ordinary skill in the art would understand that apparatus 10 may include components or features not shown in FIG. 11.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 11.

As illustrated in the example of FIG. 11, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 11, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-9.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-9.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to detect a power exposure event at the apparatus. Apparatus 10 may also be controlled by memory 14 and processor 12 to report the power exposure event to a network element. Apparatus 10 may further be controlled by memory 14 and processor 12 to receive instructions from the network element to activate a duty cycle pattern at the apparatus. In addition, apparatus 10 may be controlled by memory 14 and processor 12 to activate the duty cycle pattern by performing uplink transmission based on a new communication pattern.

As illustrated in the example of FIG. 11, an apparatus 20 may be a node or element in a communications network or associated with such a network, such as a base station, a Node B, an evolved Node B (eNB), 5G Node B or access point, next generation Node B (NG-NB or gNB), NM, BS, primary cell, secondary cell, active cell, serving cell, and/or WLAN access point, associated with a radio access network (RAN), such as an LTE network, 5G or NR. It should be noted that one of ordinary skill in the art would understand that apparatus 20 may include components or features not shown in FIG. 11.

As illustrated in the example of FIG. 11, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8(*b*), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-8 and 10.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-8 and 10.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term “circuitry” may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term “circuitry” may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In other example embodiments, apparatus 20 may be controlled by memory 24 and processor 22 to receive configuration of a first communication pattern for uplink coordination for a user equipment. Apparatus 20 may also be controlled by memory 24 and processor 22 to configure the user equipment with the first communication pattern for uplink coordination. Apparatus 20 may further be controlled by memory 24 and processor 22 to receive a report from the user equipment of a power exposure event at the user equipment during the first communication pattern. In addition, apparatus 20 may be controlled by memory 24 and processor 22 to request from a primary or a secondary cell of a new communication pattern, and receive an acknowledgment of the requested new communication pattern. Alternatively, apparatus 20 may be control by memory 24 and processor 22 to inform a primary or a secondary cell of the new communication pattern, and enforce an uplink duty cycle pattern at the user equipment in response to the power exposure event.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for detecting a power exposure event at the apparatus. The apparatus may also means for reporting the power exposure event to a network element. The apparatus may further include means for receiving instructions from the network element to activate a duty cycle pattern at the apparatus. In addition, the apparatus may include means for activating the duty cycle pattern by performing uplink transmission based on a new communication pattern.

Other example embodiments may be directed to an apparatus that includes means for receiving configuration of a first communication pattern for uplink coordination for a user equipment. The apparatus may also include means for configuring the user equipment with the first communication pattern for uplink coordination. The apparatus may further include means for receiving a report from the user equipment of a power exposure event at the user equipment during the first communication pattern. In addition, the apparatus may include means for requesting from a primary or a secondary cell of a new communication pattern, and receiving an acknowledgment of the requested new communication pattern.

Alternatively, the apparatus may include means for informing a primary or a secondary cell of the new communication pattern, and enforcing an uplink duty cycle pattern at the user equipment in response to the power exposure event.

Certain example embodiments described herein provide several technical improvements, enhancements, and/or advantages. In some example embodiments, it may be possible to improve UL TDM coordination for a UE with multiple active links under MPE consideration. In other example embodiments, it may be possible to maximize resource usage in dual connectivity (DC) under MPE events. In addition, according to certain example embodiments, the UE may be able to update the TDM pattern to use full throughput at all instances of DC with explicit signaling of MPE event between cells. The UE may also update the TDM pattern to use full throughput at all instances of DC by autonomously switching TDM pattern configuration triggered by the MPE event. According to other example embodiments, duty cycling for MPE may be achieved through TDM patterns such as prioritization of RACH/PUCCH occasions may be coordinated by serving and target cells or primary and secondary cells.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3rd Generation Partnership Project
5G 5th Generation
5GCN 5G Core Network
BS Base Station
CE Control Element
CU Central Unit
DAPS Dual Active Protocol Stack
DC Dual Connectivity
DU Distributed Unit
eNB Enhanced Node B
gNB 5G or Next Generation NodeB
LTE Long Term Evolution
MAC Medium Access Control
MG Measurement Gap
MGL Measurement Gap Length
MGRP Measurement Gap Repetition Period
Maximum Permissible Exposure MPE
New Radio NR
PBO Power Back-off
RRC Radio Resource Control
RSRP Reference Signal Received Power
SNR Signal to Noise Ratio SSB Synchronization Signal Block
SS-RSRP Synchronization Signal RSRP
TDM Time Division Multiplexing
UE User Equipment
UL Uplink

The invention claimed is:

1. A method, comprising:

receiving configuration of a first communication pattern for uplink coordination for a user equipment, wherein the user equipment is in a dual connectivity configuration with a primary cell and a secondary cell;

configuring the user equipment with the first communication pattern for uplink coordination;

receiving a report from the user equipment of a power exposure event at the user equipment during the first communication pattern;

requesting from the primary or the secondary cell of a new communication pattern, wherein the request of the new communication pattern comprises indicating one or more uplink slots that are not used; and receiving an acknowledgement of the requested communication pattern, the acknowledgement further comprising an indication of uplink slots that are not used; and enforcing an uplink duty cycle pattern at the user equipment in response to the power exposure event, wherein the uplink duty cycle pattern comprises a time division multiplexing pattern indicating uplink slots used for the primary cell and uplink slots used for the secondary cell, wherein requesting from the primary cell or the secondary cell of the new communication pattern comprises negotiating the new communication pattern, wherein the primary cell or the secondary cell rejects the new communication pattern and indicates a reason for the rejection, and wherein a further new communication pattern is proposed in response to the rejection.

2. The method according to claim 1, further comprising:

pre-configuring the user equipment with a plurality of communication patterns with a corresponding power exposure event condition.

3. The method according to claim 2, further comprising:

signaling the user equipment to switch from a current uplink communication pattern to one of the plurality of pre-configured uplink communication patterns.

4. The method according to claim 1, further comprising:

scheduling the user equipment for an uplink slot freed by the secondary cell in response to the new communication pattern.

5. An apparatus, comprising:

at least one processor; and at least one memory comprising computer program code, the at least one memory and the computer program code are configured, with the at least one processor, to cause the apparatus at least to detect a power exposure event at the apparatus, wherein the apparatus is operating in a dual connectivity configuration with at least a primary cell and a secondary cell;

report the power exposure event to a network element;

receive instructions from the network element to activate a duty cycle pattern at the apparatus;

request a primary cell or a secondary cell to change to a new communication pattern; and activate the duty cycle pattern by performing uplink transmission based on the new communication pattern, wherein the new communication pattern comprises a time division multiplexing pattern for uplink coordination between the primary cell and the secondary cell, and wherein activating the duty cycle pattern comprises identifying which transmission slot is not used by the apparatus for uplink with the network element, wherein the at least one memory and the computer program code are further configured, with the at least one processor, to cause the apparatus at least to:

report the power exposure event by indicating a required change for uplink scheduling to the network element, thereby indirectly reporting the power exposure event to the network element; and receive an uplink grant from another active cell for an uplink slot freed by the duty cycle pattern, wherein the another active cell received information about the change in uplink regime of the apparatus from the network element.

6. The apparatus according to claim 5, wherein the report of the power exposure event comprises a report of a power management-maximum power reduction level.

7. The apparatus according to claim 5, wherein the apparatus is pre-configured with a plurality of uplink communication patterns.

8. The apparatus according to claim 7, wherein the at least one memory and the computer program code are further configured, with the at least one processor, to cause the apparatus at least to:

autonomously switch from a current communication pattern or a current duty cycle to one of the pre-configured uplink communication patterns or a current duty cycle.

9. The apparatus according to claim 8, wherein the at least one memory and the computer program code are further configured, with the at least one processor, to cause the apparatus at least to:

after the autonomous switch, inform the secondary cell about the power exposure event, wherein the secondary cell informs the primary cell of a change in the time division multiplexing pattern.

10. The apparatus according to claim 7, wherein the at least one memory and the computer program code are further configured, with the at least one processor, to cause the apparatus at least to:

receive instructions from the network element to switch from a current uplink communication pattern to one of the pre-configured uplink communication patterns.

11. The apparatus according to claim 7, wherein each of the plurality of pre-configured uplink communication patterns corresponds to a respective power management-maximum power reduction level, such that detection of a specific power management-maximum power reduction level triggers use of the corresponding pre-configured uplink communication pattern.

12. The apparatus according to claim 5, wherein activating the duty cycle pattern comprises switching uplink slot use from an active cell experiencing the power exposure event to another active cell not experiencing the power exposure event, and wherein the apparatus receives uplink scheduling from the another active cell not experiencing the power exposure event.

13. The apparatus according to claim 5, wherein a number of available uplink slots in the time division multiplexing pattern is determined based on a power management-maximum power reduction level of the power exposure event.

* * * * *